United States Patent
Schatz et al.

[15] 3,700,158
[45] Oct. 24, 1972

[54] APPARATUS FOR MAKING THIN WALLED METAL TUBING

[72] Inventors: Friedrich Schatz, 3012 Langenhagen Karl-Kellner-Str. 62; Harry Stachewski, 3012 Langenhagen Gutenberg str. 20, both of Germany; Gunther Lehnert, deceased, late of Hannover, Germany by Gerda Lehnert, administratrix

[22] Filed: April 23, 1970

[21] Appl. No.: 31,074

Related U.S. Application Data

[63] Continuation-in-part of Ser. No. 659,792, Aug. 10, 1967, abandoned.

[52] U.S. Cl. .....................228/15, 226/173, 228/47
[51] Int. Cl. ..............................................B23k 1/20
[58] Field of Search ........226/165, 173, 111; 29/480; 228/15, 17, 44, 47, 49

[56] References Cited

UNITED STATES PATENTS

| | | |
|---|---|---|
| 2,003,118 | 5/1935 | Mirfield et al. ..............228/15 |
| 2,693,632 | 11/1954 | Heussner ................29/480 X |
| 3,085,729 | 4/1963 | Lehnert......................226/173 |
| 3,236,083 | 2/1966 | Linderoth, Jr. et al. ..228/17 X |
| 3,333,754 | 8/1967 | Catalano et al..............228/15 |
| 3,344,305 | 9/1967 | Ogden et al............226/111 X |
| 3,351,034 | 11/1967 | Grek......................226/173 X |
| 3,361,319 | 1/1968 | Sato et al.................228/17 X |

*Primary Examiner*—John F. Campbell
*Assistant Examiner*—Richard B. Lazarus
*Attorney*—Philip G. Hilbert

[57] ABSTRACT

Process and apparatus for forming metal tubing from thin metal strip with a longitudinally extending welded seam, and including means for moving and positively gripping the tubing as it is transported towards and beyond a welding station to thereby avoid any stresses which would have adverse affects on the tubing including the seamed area thereof.

7 Claims, 3 Drawing Figures

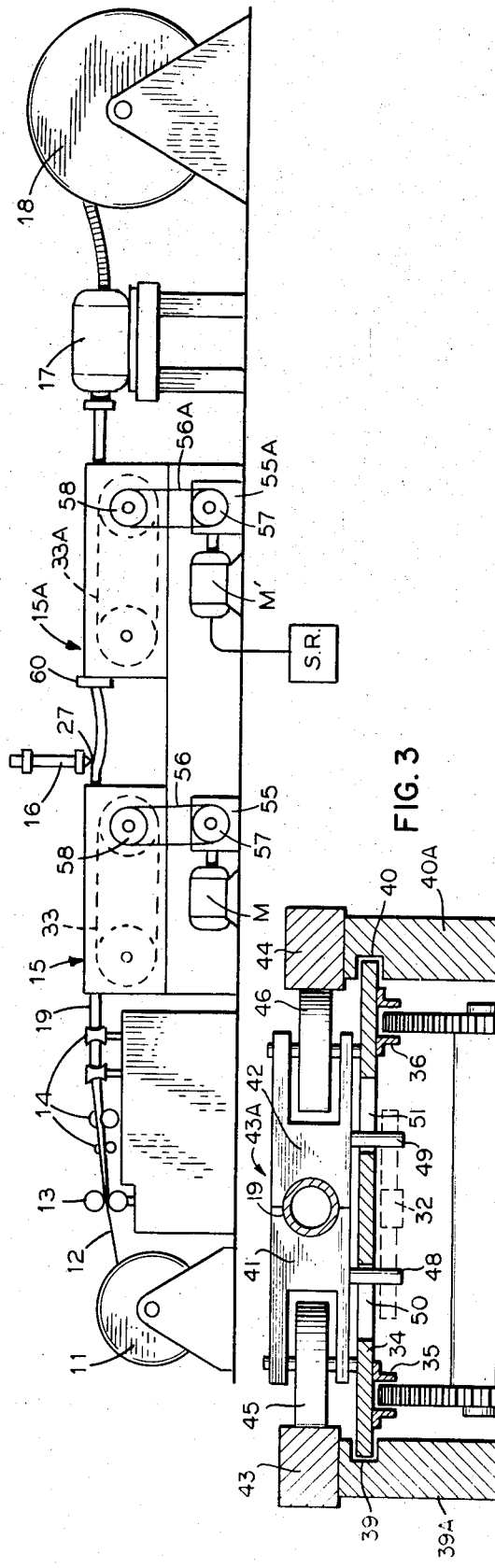

3,700,158

APPARATUS FOR MAKING THIN WALLED METAL TUBING

This application is a continuation in part of application Ser. No. 659,792, filed Aug. 10, 1967, now abandoned.

BACKGROUND OF THE INVENTION

Metal tubing has been formed in a continuous manner by moving metal strip through forming rollers which convert the strip to tubular form with the longitudinal edges thereof adjacent each other; the edges being welded together to form a longitudinal seam in the tubing. It is also known to transversely corrugate the freshly formed tubing to render the same highly flexible. Such corrugated tubing has been used as a conduit for fluids and gases.

The corrugated tubing has also been used as a sheath for electrical cables and conductors; in which case, the cable core or conductors are introduced into the tubing in the initial stages of its formation.

As the tubing must be moved longitudinally during its formation, seaming and corrugation or the like; various forces are brought to bear on the tubing. Further, the corrugation of the tubing involves torsional forces at the point of corrugation, which forces must be isolated from the portions of the tubing moving in advance of the point of corrugation so as to prevent displacement of the meeting edges of the tubing and to avoid impairment of the freshly welded seam.

To avoid the adverse affects described above, tube forming and corrugating machines have been provided with gripping means for engaging the moving tubing between the welding station and the corrugating station, see U.S. Pat. No. 3,085,729, whereby to prevent the transmission of torsional forces to the welding point, and further, to positively move the tubing throughout its various successive forming stages. Such gripping means comprises pairs of laterally related jaw members which are movable transversely of the path of the movement of the tubing, toward and away from each other. Such jaw members are mounted on driven endless chain means so as to move longitudinally with the tubing and to grippingly engage and disengage the moving tubing at appropriate points in the transport of the tubing.

It has also been proposed to form metal tubing by welding a longitudinal seam therein, wherein the metal portions adjacent the seam are preheated. When making tubing of small diameters and/or very small wall thickness, that is, tubing with a small thermal capacity per unit length, the forces necessary to move the tubing through the forming apparatus may deform the heated metal portion and may displace the edges of the tubing. This may result in disrupted seam portions or irregular joinder of the seam edges.

Accordingly, an object of this invention is to provide improved procedures and apparatus for forming metal tubing of small diameters which may be of the order of 6–10 mm. and from thin metal strip having a thickness of the order of 0.15 to 0.30 mm., wherein a longitudinally extending welded seam is formed; the tubing being positively moved and gripped as it approaches the welding station, as well as after the welding station.

A further object of this invention is to provide in tube making procedures and apparatus, means providing balanced moving forces operating in the same direction at points before and after the welding station, so as to minimize any adverse forces arising at various points in the path of movement of the tubing as the same is being formed.

SUMMARY OF THE INVENTION

The instant invention relates to apparatus and procedures for making metal tubing of very small diameter, which is derived from very thin metal strip; wherein the strip is curved into tubular form with longitudinally extending abutting edges to form a seam which is closed by welding; gripping means being provided at a point well in advance of the welding station to grip the tubing and to positively move the same toward the welding station; further gripping means being provided at a point beyond the welding station to grip the tubing and transport the same beyond said welding station.

BRIEF DESCRIPTION OF THE DRAWINGS

FIG. 1 is a side elevational view showing apparatus for forming metal tubing in accordance with the instant invention;

FIG. 2 is a top plan view thereof; and

FIG. 3 is a transverse sectional view thereof.

DESCRIPTION OF THE PREFERRED EMBODIMENT

As shown in FIG. 1, 10 designates an apparatus for making metal tubing in accordance with the invention. The tubing is formed from a continuous metal strip 12 taken from a reel 11. Strip 12 may be of copper, aluminum, stainless steel or the like, and has a thickness of the order of 0.2 mm. The strip 12 is cut to a precise width by trimming rollers 13 and is progressively curved into tubular form by forming rollers 14, to provide tubing 19 with the longitudinal edges thereof in substantially abutting relation. The tubing 19 may have a diameter of the order of about 6.5 mm.

The tubing 19 with its split edges is then positively engaged and gripped by gripping means generally indicated at 15 and is transported to welding means 16 which welds the adjacent tube edges to form a longitudinal seam therein. The welded tubing is then positively engaged and gripped by gripping means generally indicated at 15A and is positively transported to a corrugating device 17, well known in the art, which forms transverse corrugations in the tubing. The finished tubing is wound on a takeup reel 18.

The details of the combined transporting and gripping means 15 and 15A, is shown in FIGS. 2 and 3. The tubing 19 enters apparatus 15 at 20 and is met by a pair of laterally related gripper members 21 which are arranged for movement toward and away from each other and include semicircular jaw means adapted to encircle and grip tubing 19 when the jaw means are moved toward each other, by the action of rollers 24, 25 bearing against converging portions 22A, 23A of opposed cam track means 22, 23.

The next longitudinally spaced set of gripper members 21A, similar to members 21, are shown in fully engaged and gripping relation to tubing 19, with their rollers 24, 25 bearing on parallel cam portions 22', 23' of cam track means 22, 23.

Thus, tubing 19 is positively gripped and moved toward welding means 16 at a point 27 immediately beyond gripping means 15. As the gripped tubing 19 approaches welding means 16, gripper members 21B, similar to members 21, 21A and longitudinally displaced therefrom, are shown in positions laterally displaced from each other, through the action of gib means 28 acting to displace the gripper jaws of members 21B, in association with diverging cam portions 22B, 23B of cam track means 22, 23.

The freshly welded tubing 19 is then gripped and further transported toward corrugating means 17, by the combined transporting and gripping means 15A, which is similar to device 15. Thus, the tubing 19 is reengaged and gripped by a set of gripper members 30 which are moved toward each other by rollers 24, 25 bearing on converging cam portions 22A, 23A of cam track means 22C, 23C; while suceedding pairs of gripper members 43A including gripper elements 41, 42 maintain a gripping relation on tubing 19 during continued longitudinal movement thereof, through rollers 24, 25 thereof bearing against opposed, parallel cam portions 22' and 23' of cam track means 22C, 23C.

Thus, the tubing 19 is moved toward outlet 31 of apparatus 15A; from whence the tubing passes to corrugating means 17. Gib means 32, similar to gibe means 28, located immediately in advance of outlet 31, is effective to laterally displace the gripper members 21B, in conjunction with diverging cam portions 22B, 23B of cam track means 22C, 23C, thereby releasing the tubing 19.

As shown in FIG. 3, the successive pairs of gripper members 21, 21A, 21B, etc. are arranged for longitudinal movement in apparatus 15, by carrier means 34 attached to endless chains 33, FIG. 1, at 35, 36 which are led over sprocket wheels 37, 38 which are driven by a motor M, gear box 55, sprocket chain 56 and sprocket wheels 57, 58. The carrier 34 projects on its sides in cutouts 39, 40 formed in standards 39A, 40A and support jaw elements 41, 42 of said gripper members 21, 21A, 21B, etc. which are arranged for slidable movement toward and away from each other.

The jaw elements 41, 42 carry rollers 45, 46 which are rotatable on vertical axes to engage track portions 43, 44 of cam track means 22, 23. The jaw elements 41, 42 are further provided with depending guide pins 48, 49 which pass through cutouts 50, 51 in carrier 34, for engagement with the diverging side edges of gib 28, whereby said jaw elements are displaced from each other to release tubing 19, as the same passes to outlet 20A of apparatus 15.

The gripper members 30, 43A, 21B, etc. in apparatus 15A, are similarly transported, as indicated above. The endless chains 33A, are moved by means of motor M', gear box 55A, sprocket chain 56A and sprocket wheels 57, 58. While motor M of apparatus 15 is set at a determined constant speed; motor M' of apparatus 15A, is adjustably varied by speed regulator means SR. Thus, transport of tubing 19 in apparatus 15A may be at a speed somewhat greater then that of apparatus 15, being anywhere from about 1 percent to compensate for thermal expansion of the tubing after heating and welding, to 10—25 percent to compensate for deformation of the tubing as by corrugating the same, or when drawing the tubing 19 by a drawing die 60, located at inlet 61 of apparatus 15A.

It will be apparent that the combined gripping and transporting apparatus 15 and 15A, is highly effective in neutralizing various stresses that may arise as an incident to the formation of tubing 19, both before welding station 16 and after said welding station. Thus, the adjacent edges of the tubing will be precisely located and maintained as the tubing approaches the welding means 16 and the frehly formed welded seam in the tubing will be undisturbed by any forces which would be otherwise effective to adversely affect the same. Further, high precision details demanded in metal tubings of very small diameters and formed of very thin metal strip, will be maintained by apparatus and procedures of the instant invention.

The details of the gripper elements and their mounting on the carrier and endless chains, for transporting the same while simultaneously engaging or disengaging the transported tubing, are shown in U.S. Pat. No. 3,085,729.

We claim:

1. Apparatus for forming small diameter metal tubing from thin metal strip comprising means for forming said strip in tubular form with opposite longitudinal edges of the strip disposed adjacent each other, means located beyond said forming means for welding the adjacent edges of said tubing to form a longitudinal seam therein, means for releasably gripping said tubing as it moves toward and beyond said welding means, said gripping means comprising first and second sets of longitudinally spaced, laterally related pairs of gripping members arranged for movement toward each other for positively gripping said tubing therebetween and for movement away from each other to release said tubing, first means for transporting the first set of pairs of gripper members longitudinally with said tubing toward said welding means, first gripper member actuating means located in advance of said welding means for successively, (1) moving said gripper members toward each other to grip said tubing, (2) maintaining said gripper members in gripping relation to said tubing during continued longitudinal movement thereof, and (3) moving said gripper members away from each other to release said tubing immediately in advance of said welding means; second means for transporting the second set of pairs of gripper members longitudinally with said tubing beyond said welding means, and second gripper member actuating means located beyond said welding means for successively, 1) moving said gripper members toward each other for gripping said tubing therebetween, (2) maintaining said gripper members in gripping relation to said tubing during continued longitudinal movement thereof beyond said welding means, and (3) thereafter moving said gripper members away from each other to release said tubing.

2. Apparatus as in claim 1 wherein each of said transport means comprises endless chain means extending along the path of movement of said tubing, one chain means extending from a point well in advance of said welding means to a point immediately short of said welding means, the other chain means extending from a point immediately beyond said welding means, means for mounting said pairs of gripper members in longitudinally spaced relation on said chain means, said first and second gripper actuating means being arranged to actuate at least one pair of gripper members of the first set of gripper members into gripping relation with said tubing in advance of said welding means and at least one pair of gripper members of the second set of gripper members simultaneously therewith into gripping relation with said tubing beyond said welding means, 3. Apparatus as in claim 1 wherein said gripper member actuating means comprises elongated cam means extending along the path of movement of said tubing, said cam means comprising successive edge portions engageable by opposed portions of said pairs of gripper members for successively, (1) moving said gripper members into gripping relation with said tubing, and (2) maintaining said gripper members in gripping relation to said tubing during the continued longitudinal movement thereof.

4. Apparatus as in claim 3, and further including means for displacing said pairs of gripper members from each other to release said tubing at a first point immediately in advance of said welding means, and at a second point beyond and remote from said welding means.

5. Apparatus as in claim 1, and further including means for varying the speed of said second transport means relative to that of said first transport means.

6. Apparatus as in claim 1, and further including die means for drawing said tubing, said die means being located between said welding means and the second set of pairs of gripping members.

7. Apparatus as in claim 1 and further including means for transversely corrugating said tubing, said corrugating means being located beyond the second set of pairs of gripper members.

* * * * *